INVENTOR

Harry F. Cooke

BY Stevens, Davis, Miller & Mosher

ATTORNEYS

INVENTOR
Harry F. Cooke
BY Stevens, Davis, Miller & Mosher
ATTORNEYS 2,994,830
Patented Aug. 1, 1961

2,994,830

TETRODE TRANSISTOR FM DETECTOR

Harry F. Cooke, Richardson, Tex., assignor to Texas Instruments Incorporated, Dallas, Tex., a corporation of Delaware Filed Apr. 13, 1959, Ser. No. 805,940
9 Claims. (Cl. 329—103)

This invention relates to phasing circuits. Although the principles underlying the invention may find application in a variety of expressions, the embodiment herein selected for illustrative description comprises a novel and improved FM detector circuit in which a tetrode transistor is advantageously utilized.

FM detector circuits are well known in the art, illustrative of which is that shown in FIGURES 10–13, page 523, of the third edition of Radio Engineering, by Terman, published by McGraw-Hill Book Company, Inc., 1947. Other circuits are known, and each has its own particular advantages and areas of greatest usefulness.

Although the circuit of the cited reference utilizes electron tubes, the increasing popularity of semiconductor devices has given impetus to the development of transistor circuits which compare favorably in linearity with those heretofore known. Certain problems have, however, arisen in adapting known circuits to the use of transistors. Consequently, there has been a continuing search for transistor FM detector circuits which provide faithfully linear detection at frequencies classically employed and which require a minimum number of circuit components.

It has heretofore been proposed to utilize a single triode transistor as an FM detector. This involved the driving of one of the transistor electrodes with the frequency-modulated signal and another of the electrodes with a corresponding signal displaced in phase therefrom by 90 degrees. Circuit parameters were selected in such manner that as the signal frequency deviated from the center, or rest frequency, the phase relationship heretofore mentioned departed from the 90 degree base, the degree of departure being a function of the frequency deviation. In consequence of such deviation, the effective biasing of the transistor elements was varied so as to result in a changing collector current which produced a demodulated signal.

Since it was required in the triode transistor detector to impress frequency-modulated signals upon two electrodes (albeit the signals differed in phase by 90 degrees), neither of the two electrodes could be completely bypassed, and degeneration occurred within the transistor itself. Such degeneration resulted in low level output and in non-linearity which gave rise to undesirable effects.

It is one general object of this invention to improve frequency-modulation detectors.

It is another object of this invention to provide a single transistor FM detector in which the audio frequency-modulating component is faithfully reproduced without degeneration.

It is still another object of this invention to minimize the number of circuit components required in a transistor FM detector.

It is yet another object of this invention to provide an advantageously novel method of loosely coupling tuned circuits to affect alternating voltage phase quadrature relationships.

Consequently, in accordance with one feature of the invention, a tetrode transistor is employed, and a signal corresponding to the frequency-modulated signal, but displaced therefrom in phase by 90 degrees, is derived by an advantageous utilization of the capacitance of the base layer of a junction transistor.

In accordance with another feature of the invention, advantage is taken of the dual base connections in a tetrode transistor by effectively adding and subtracting vector components of the voltages impressed upon the two base leads as the voltages vary in phase displacement in the presence of an introduced frequency-modulated signal.

In accordance with still another feature of the invention, the two previously-mentioned voltages are introduced to the same transistor element, thereby permitting the effective bypassing of the remaining elements.

Other objects and features of the invention will be apparent from the following detailed description, by way of example, with reference to the drawing in which.

Figure 1:
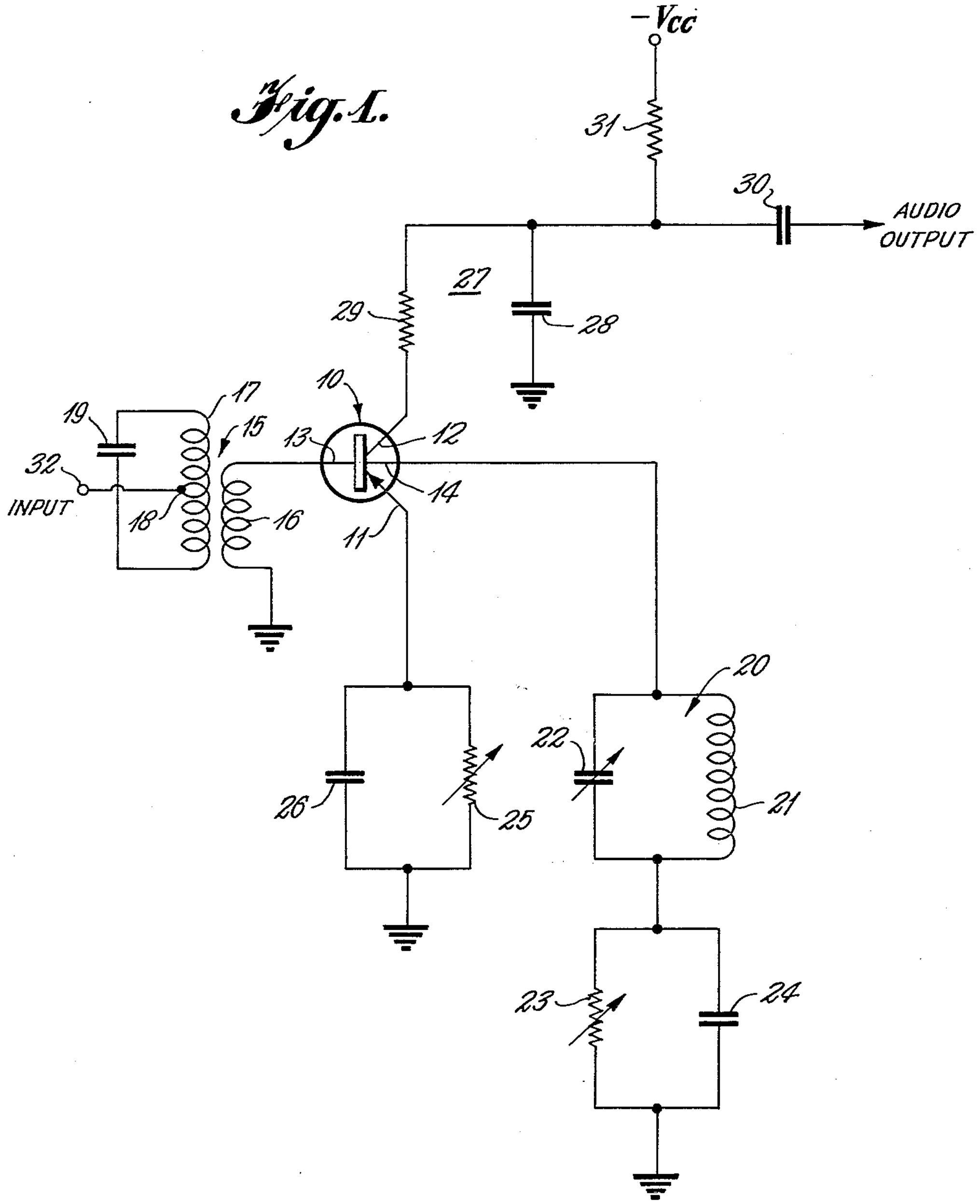
FIGURE 1 is a schematic diagram of one illustrative embodiment of the invention.

Now turning to the drawing and in particular to FIGURE 1 thereof, it will be seen that there is therein depicted a tetrode-type transistor 10 having an emitter 11, a collector 12, and two base leads 13 and 14. The emitter element 11 is bypassed to ground through a conventional parallel biasing and bypassing circuit comprising variable resistor 25 and capacitor 26, thus identifying the circuit as being of the common emitter type.

The transistor base element 13 is connected over the obvious path to the upper end of secondary winding 16 of transformer 15. The primary of transformer 15 is seen to consist of winding 17 which is parallel tuned by capacitor 19 to the center, or rest, frequency of the incoming FM signal.

Input terminal 32 is connected to tap 18 of primary winding 17. Although the primary 17 could be excited in other ways such as by inductive coupling, a tapped connection is shown since it has been found to provide an advantageous means for matching impedances between the output circuit of the incoming signal source and the input circuit of the present detector. Thus, for example, the tap 18 could be moved along the coil 17 to a point thereupon at which the desired impedance is found. In addition, the use of a tap permits the adjustment of the operating Q.

It is well known that when two circuits tuned to the same frequency are loosely coupled, either inductively or capacitively, the voltages individually appearing thereupon will be displaced in phase by 90 degrees. For reasons that will hereinafter become apparent, it is desired to effect such a phase relationship between voltages appearing at the two base leads 13 and 14. Accordingly, in FIGURE 1, advantage is taken of the loose capacitive coupling existing between base leads 13 and 14 to effect a coupling of the signal voltage at base lead 13 to tuned tank 20 via base lead 14. In the alternate embodiment of FIGURE 2, the winding 21 is loosely coupled inductively to the primary winding 17 of transformer 15. In both circuits, provision is made for adjusting the bias on base lead 14 by including a variable resistor 23 in series with the tuned tank 20. As will be noted from inspection of the circuits, capacitor 24 is arranged to bypass resistor 23 at incoming signal frequencies.

Figure 3:
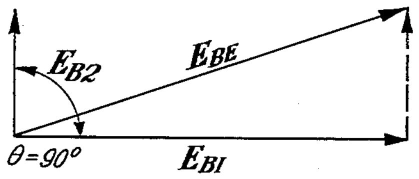
FIGURE 3 is a vector diagram depicting the relationships of certain voltages which appear in the presence of an unmodulated signal.

Now turning to FIGURE 3, it will be noted therein that two voltage vectors are shown and are identified $E_{B1}$ and $E_{B2}$. The first of these voltages, i.e., $E_{B1}$, is the voltage which appears at the base lead 13 when an unmodulated signal of proper frequency (i.e., the center, rest, or undeviated FM frequency) is received. The second of the voltge vectors, i.e., $E_{B2}$, is the voltage which appears at the base lead 14 when the unmodulated signal is received; and an inspection of the diagram will show that these voltages are displaced through an angle of 90°. The remaining voltage vector in FIGURE 3, i.e., $E_{BE}$, is the resultant of these two voltages, and is the effective base voltage to which the transistor is operatively responsive. It is this voltage which determines the collector current, and it is for this reason that its change, as shown in FIGURES 4 and 5, is effective to result in the production of a detected signal at collector 12.

Not only is it known that the aforementioned 90 degree relationship exists between voltages in two identically-tuned loosely-coupled circuits when a signal of the tuned frequency is introduced to one of them, but it is also known that if the frequency of the signal deviates from that of resonance, the phase relationship between the two voltages becomes either greater or less than 90 degrees depending upon whether the deviation results in an increase or a decrease of signal frequency. Thus, for example, if the frequency is increased, the phase relationship between the two voltages will increase to a value greater than 90 degrees, whereas if the frequency decreases below the resonance frequency, the phase relationship will decrease to a value less than 90 degrees. These relationships are shown in FIGURES 4 and 5, FIGURE 4 being representative of the voltage relationships which exist when the received signal is of frequency less than that of resonance, FIGURE 5 being representative of the voltage relationships which exist when the received signal is of frequency greater than that of resonance.

Figure 4:
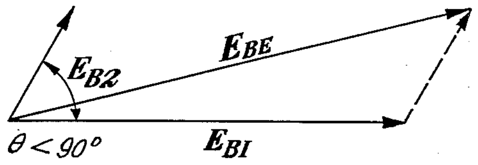
FIGURE 4 is a similar diagram showing the relationships of corresponding voltages which appear in the presence of a signal of frequency greater than that of the center frequency.
Figure 5:
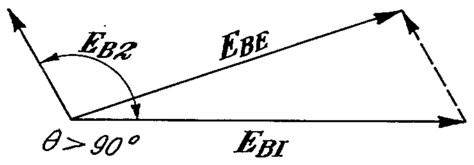
FIGURE 5 is a similar diagram showing the relationships of corresponding voltages in the presence of a signal having a frequency less than that of the center frequency.

Now considering FIGURE 4, it will be seen that as the angle of displacement $\theta$ between the two aforementioned voltages decreases, the effective base voltage, $E_{BE}$, increases, for $E_{BE}$ is the vector sum of the voltages $E_{B1}$ and $E_{B2}$. Conversely, referring to FIGURE 5, it will be seen that as the phase angle $\theta$ increases to a value greater than 90°, $E_{BE}$ decreases, for again $E_{BE}$ is equal to the vector sum of $E_{B1}$ and $E_{B2}$.

It will now be apparent that the effective base voltage, $E_{BE}$, i.e., the instantaneous effective bias upon the base of the transistor, will vary as a function of the frequency deviation of the FM signal. Since the collector current will vary substantially linearly as the effective base voltage, it will be apparent that the output of the transistor will be a detected signal.

Now turning again to FIGURE 1, it will be seen that collector lead 12 is serially connected through resistor 29 to D.-C. blocking capacitor 30, and that capacitor 28 is connected in shunt from the junction of resistor 29 and capacitor 30 to ground. Capacitor 28 serves a dual function. The first function is to bypass carrier signal components to ground. The second is to cooperatively associate with resistor 29 to form a de-emphasis network 27 which compensates for the traditional nonlinearity in modulation practiced by United States FM broadcasting stations.

Figure 2:
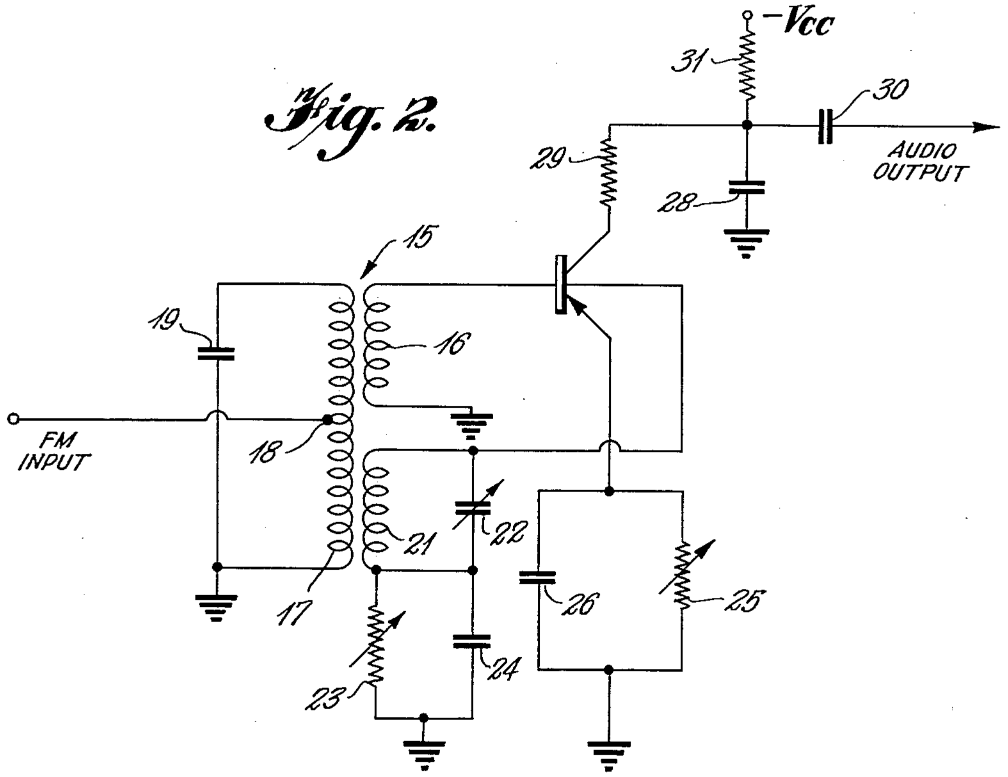
FIGURE 2 is a schematic diagram of an alternate embodiment of the invention.

In order to achieve an optimum signal-to-noise ratio, it has been found desirable to modulate an FM signal more vigorously at high audio than at low audio frequencies. Consequently, if no compensation is employed at the FM receiver, the amplitude of relatively high frequency audio signals will be greater than that which would represent a faithful reproduction of the original signal source, and it has become traditional to provide a de-emphasis network in FM receivers to compensate for this non-linearity in modulation. In the circuits of FIGURES 1 and 2, resistor 29 and capacitor 28 are selected to provide a time constant of approximately 75 microseconds which has been established as being that required to provide desired compensation.

As is obvious from inspection of the drawing, the detector audio output is taken from the right hand terminal of capacitor 30 via the indicated lead; and operating voltage is introduced from source $-Vcc$ via resistor 31.

The circuits of FIGURE 2 incorporate the same principles of operation as those of FIGURE 1 except for the coupling arrangement between the tuned circuits. As mentioned before, the circuits of FIGURE 2 embody an alternative arrangement in which instead of relying upon capacitive coupling, as is the case with the circuits of FIGURE 1, the circuits of FIGURE 2 are arranged to utilize inductive coupling between the primary winding 17 of transformer 15 and the winding 21 of the tuned tank circuit 20. Except for this modification, the circuits of FIGURE 2 are identical with those of FIGURE 1, and the same basic principles of operation outlined above are applicable thereto.

While I have illustrated my invention by two illustrative embodiments thereof, it is not my intention to limit the scope to the particular arrangements shown and described. Various applications, modifications, and adaptations will occur to one skilled in the art.

The terms and expressions herein employed are used as terms of description and not of limitation, and there is no intention in the use thereof to exclude any and all equivalents, but on the contrary, it is my intention to include any and all equivalents, adaptations, and modifications which fall within the scope of my invention.

What is claimed is:

1. A circuit comprising a plural element semiconductive device having a pair of electrodes connected to one element thereof at a spaced-apart interval thereupon, a first circuit tuned to a predetermined frequency connected to one of said electrodes, a second circuit tuned to said predetermined frequency connected to the other of said electrodes, and means effective when a signal of said predetermined frequency is introduced to one of said tuned circuits for developing a corresponding signal in phase quadrature within the other of said tuned circuits.

2. A circuit comprising a plural element semiconductive device having a pair of electrodes connected to one element thereof at a spaced-apart interval to exhibit a predominantly capacitive impedance therebetween, a first circuit tuned to a predetermined frequency connected to one of said electrodes, a second circuit tuned to said predetermined frequency connected to the other of said electrodes, and means including said predominantly capacitive impedance effective when a signal of said predetermined frequency is introduced to one of said tuned circuits for developing a corresponding signal in phase quadrature with said signal of said predetermined frequency within the other of said tuned circuits.

3. A circuit comprising a plural element semiconductor device having a pair of electrodes connected to a first element thereof, means for operatively biasing said semiconductor device, a first source of alternating voltage connected between one of said pair of electrodes and a point of reference potential, a second source of alternating voltage connected between the other of said pair of electrodes and said point of reference potential, and means connecting a second element of said semiconductor device to said point of reference potential whereby said first element will be biased with respect to said second element according to the vector sum of the alternating voltages of said first and second sources.

4. Apparatus according to claim 3 wherein the alternating voltages of said first and second sources are of the same frequency and vary in phase about a steady-state value of 90°.

5. A circuit comprising a plural element semiconductive device having a pair of electrodes connected to one element thereof at a spaced-apart interval upon said one element to exhibit a predominantly capacitive impedance therebetween, means for operatively biasing said semiconductive device, a first circuit tuned to a predetermined frequency connected to one of said electrodes, a second circuit tuned to said predetermined frequency connected to the other of said electrodes, and means including said predominantly capacitive impedance effective when a signal of said predetermined frequency is introduced to one of said tuned circuits for developing a corresponding signal in phase quadrature within the other of said tuned circuits.

6. A circuit comprising a plural element semiconductive device having a pair of electrodes connected to one element thereof at a spaced-apart interval upon said one element to exhibit a predominantly capacitive impedance therebetween, means for operatively biasing said semiconductive device, a first circuit tuned to a predetermined frequency connected to one of said electrodes, a second circuit tuned to said predetermined frequency connected to the other of said electrodes, means including said predominantly capacitive impedance effective when a signal of said predetermined frequency is introduced to one of said tuned circuits for developing a corresponding signal in phase quadrature within the other of said tuned circuits, and means including the semiconductive element to which said pair of electrodes is common for effectively biasing said semiconductive device according to the vector sum of said signal of said predetermined frequency and said corresponding signal.

7. A circuit comprising a plural element semiconductive device having a pair of electrodes connected to one of said elements, a first circuit tuned to a predetermined frequency connected to one of said electrodes, a second circuit tuned to said predetermined frequency connected to the other of said electrodes, and means including inductive coupling between said first circuit and said second circuit effective when a signal of said predetermined frequency is introduced to one of said first circuit and said second circuit for developing a corresponding signal in phase quadrature within the other of said first circuit and said second circuit.

8. A circuit comprising a plural element semiconductive device having a pair of electrodes connected to one element thereof at a spaced-apart interval upon said one element, means for operatively biasing said semiconductive device, a first circuit tuned to a predetermined frequency connected to one of said electrodes, a second circuit tuned to said predetermined frequency connected to the other of said electrodes, means including inductive coupling between said first circuit and said second circuit effective when a signal of said predetermined frequency is introduced to one of said circuits for developing a corresponding signal in phase quadrature within the other of said circuits, and means including the semiconductive element to which said pair of electrodes is common for effectively biasing said semiconductive device according to the vector sum of said signal of said predetermined frequency and said corresponding signal.

9. A circuit comprising a plural element semiconductive device having a pair of electrodes connected to one element thereof, means for operatively biasing said semiconductive device, means effective when a signal of predetermined frequency is impressed upon one of said electrodes for developing upon the other of said electrodes a corresponding signal in phase quadrature with said signal of said predetermined frequency, means including said last-mentioned means effective when said signal of said predetermined frequency deviates in frequency from said predetermined frequency for proportionally changing the phase relationship between said signal and said corresponding signal, and means including the semiconductive element to which said pair of electrodes is common for effectively biasing said semiconductive device according to the vector sum of said signal of said predetermined frequency and said corresponding signal.

References Cited in the file of this patent

UNITED STATES PATENTS

| | | |
|---|---|---|
| 2,617,022 | Overbeek | Nov. 4, 1952 |
| 2,870,413 | Cluwen | Jan. 20, 1959 |

OTHER REFERENCES

Modulator and Detector Circuits, by Sziklai, Proceedings of the IRE, vol. 41, No. 6, p. 723, June 1953.

F.M. Sound Detector, by Avins and Brady, RCA Review, vol. XVI, No. 4, December 1955, pp. 648–650.